(12) United States Patent
Sin

(10) Patent No.: US 7,319,880 B2
(45) Date of Patent: Jan. 15, 2008

(54) METHOD OF FORWARDING AN SMS MESSAGE IN A MOBILE COMMUNICATION SYSTEM

(75) Inventor: Dong-Jun Sin, Seoul (KR)

(73) Assignee: Samsung Electronics Co., Ltd (KR)

( * ) Notice: Subject to any disclaimer, the term of this patent is extended or adjusted under 35 U.S.C. 154(b) by 603 days.

(21) Appl. No.: 10/024,922

(22) Filed: Dec. 19, 2001

(65) Prior Publication Data

US 2002/0128025 A1  Sep. 12, 2002

(30) Foreign Application Priority Data

Mar. 6, 2001   (KR)  ............................... 2001-11368

(51) Int. Cl.
*H04Q 7/20* (2006.01)
(52) U.S. Cl. .................... 455/466; 455/412.2
(58) Field of Classification Search ................ 455/466, 455/412.2, 560
See application file for complete search history.

(56) References Cited

U.S. PATENT DOCUMENTS

| | | | |
|---|---|---|---|
| 5,946,629 A * | 8/1999 | Sawyer et al. | 455/466 |
| 6,104,924 A * | 8/2000 | Shirai | 455/418 |
| 6,151,507 A * | 11/2000 | Laiho et al. | 455/466 |
| 6,154,646 A | 11/2000 | Tran et al. | |
| 6,385,461 B1 * | 5/2002 | Raith | 455/518 |
| 6,408,191 B1 * | 6/2002 | Blanchard et al. | 455/566 |
| 2002/0137530 A1* | 9/2002 | Karve | 455/466 |
| 2003/0050984 A1* | 3/2003 | Pickup et al. | 709/206 |
| 2003/0114160 A1* | 6/2003 | Verkama et al. | 455/445 |

FOREIGN PATENT DOCUMENTS

WO  WO 01/22751  3/2001

OTHER PUBLICATIONS

Australian Office Action dated Oct. 25, 2002, issued in a counterpart application, namely, Appln. No. 13573/02.

* cited by examiner

*Primary Examiner*—Joseph Feild
*Assistant Examiner*—S. Smith
(74) *Attorney, Agent, or Firm*—The Farrell Law Firm, PC

(57) ABSTRACT

A method for forwarding an SMS message in a mobile communication system is disclosed. A calling mobile terminal requests transmission of an SMS message to an MC (Message Center) and the MC determines that a forwarding function is set for a called mobile terminal. If it is set, the MC transmits the SMS message to a destination mobile terminal.

1 Claim, 5 Drawing Sheets

METHOD OF FORWARDING AN SMS MESSAGE IN A MOBILE COMMUNICATION SYSTEM

PRIORITY

This application claims priority to an application entitled "Method of Forwarding SMS Message in Mobile Communication System" filed in the Korean Industrial Property Office on Mar. 6, 2001 and assigned Serial No. 2001-11368, the contents of which are hereby incorporated by reference.

BACKGROUND OF THE INVENTION

1. Field of the Invention

The present invention relates generally to a mobile communication system, and in particular, to a method of forwarding an SMS message in a mobile communication system.

2. Description of the Related Art

FIG. 1 is a schematic view of a typical cellular mobile communication system. Referring to FIG. 1, a base station (BS) 20 connects radio channels with a mobile station (MS), e.g., mobile terminal (or mobile subscriber, "MS") 10. A mobile switching center (MSC) 30 receives subscriber information from a corresponding home location register (HLR) 40 and connects a call for the MS 10 to another subscriber system, for example, another MSC or the public switched telephone network (PSTN). The MSC 30 also interconnects with at least one message center (MC) 50 that provides SMS (Short Message Service) messages to the MS 10 and to other mobile subscribers.

Mobile communication system providers typically offer a forwarding service to allow a user to answer a call that is placed to the user's cellular (or mobile) phone, despite the user being unable to use his mobile terminal. The user can answer such forwarded calls by setting the call forwarding service to forward the incoming call to a predetermined destination terminal (e.g., another cellular phone, a PSTN phone, or other type of mobile terminal). Such subscription is alternatively referred to as registering or setting the forwarding service. Mobile communication systems typically provide a SMS service as an optional service to which the user may subscribe (i.e., register or set) for the called terminal. SMS services are becoming increasing popular and are utilized by a growing number of individuals due to the advantage of facing fewer constraints of call connections, as well as the other recognized conveniences of sending SMS messages.

Conventional SMS systems, however, cannot forward an SMS message, even if a forwarding function is registered for a called mobile terminal.

FIG. 2 illustrates a conventional SMS message transmitting operation.

Referring to FIG. 2, when a calling mobile terminal 10 requests transmission of an SMS message 25 to a MC 50 via a calling MSC 30, the MC 50 translates a called number received from the calling mobile terminal 10 and transmits the translated number to a corresponding MC 50. A MC 50 applies to a corresponding called Home Location Register (HLR) 40 for information about a called mobile terminal 80. The called HLR 40 searches for the subscriber information of the called mobile terminal 80. If a forwarding function is registered for the called mobile terminal 80, i.e., terminal 80 subscribes to a call forwarding service, the MC 50 will either hold the SMS message or will transmit the SMS message directly to the called mobile terminal 80. Therefore, a destination mobile terminal 90 cannot receive the SMS message and, what is worse, the SMS message may be lost permanently. The destination terminal 90 is the terminal to which the message is to be sent.

Since the conventional forwarding services do not provide forwarding of SMS messages, an SMS message cannot be forwarded to a destination mobile terminal 90 or to a destination PSTN terminal.

SUMMARY OF THE INVENTION

It is, therefore, an object of the present invention to provide a method of forwarding a SMS message to a destination terminal.

The above and other objects are achieved by providing an SMS message forwarding method in a mobile communication system. When a calling mobile terminal requests transmission of an SMS message to an MC, the MC determines whether a forwarding function is set or registered for a called mobile terminal. If the forward function is not active, the MC transmits the SMS message to the called mobile terminal. If the forward function is set, the MC transmits the SMS message to a destination mobile terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

The following detailed description of a preferred embodiment of the invention will be made in reference to the accompanying drawings. In describing the invention, explanation about related functions or constructions which are known in the art will be omitted for the sake of clearness in understanding the concept of the invention.

Figure 1:
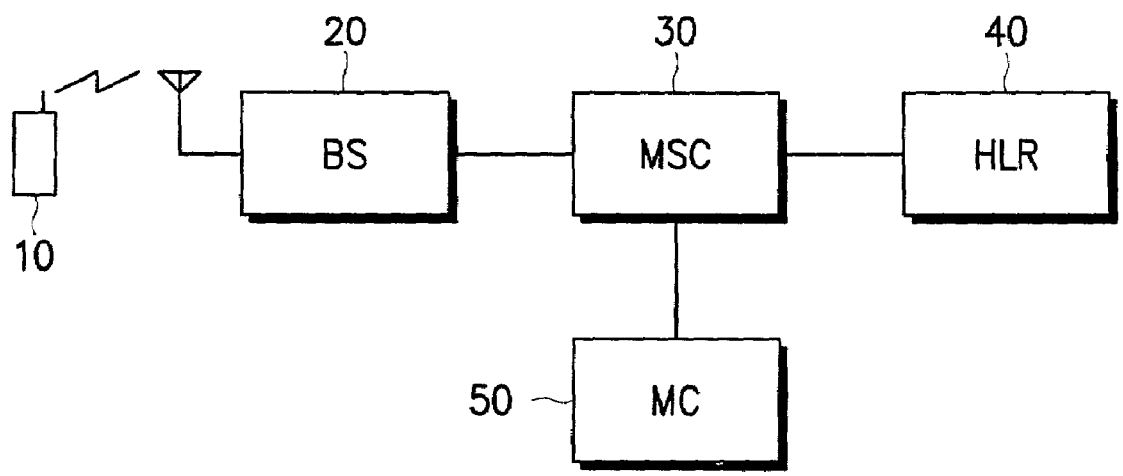
FIG. 1 is block diagram of a typical cellular mobile communication system of the prior art.
Figure 2:
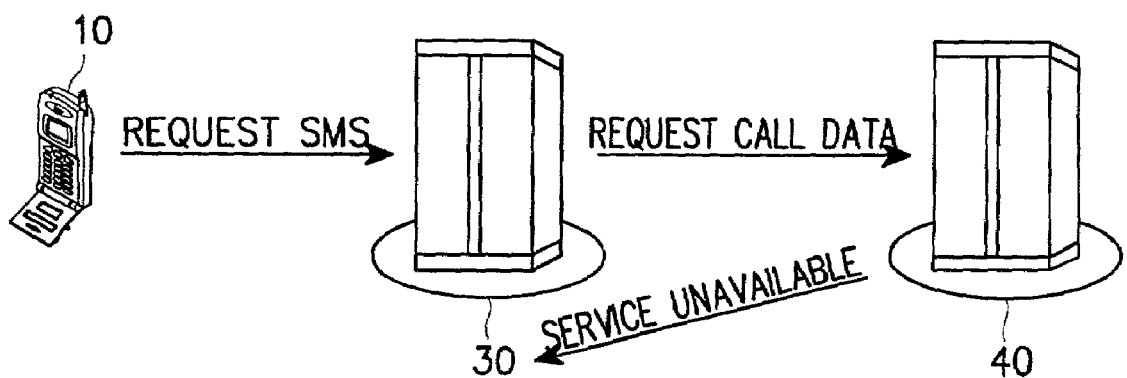
FIG. 2 illustrates a conventional SMS message transmitting operation of the prior art.
Figure 3:
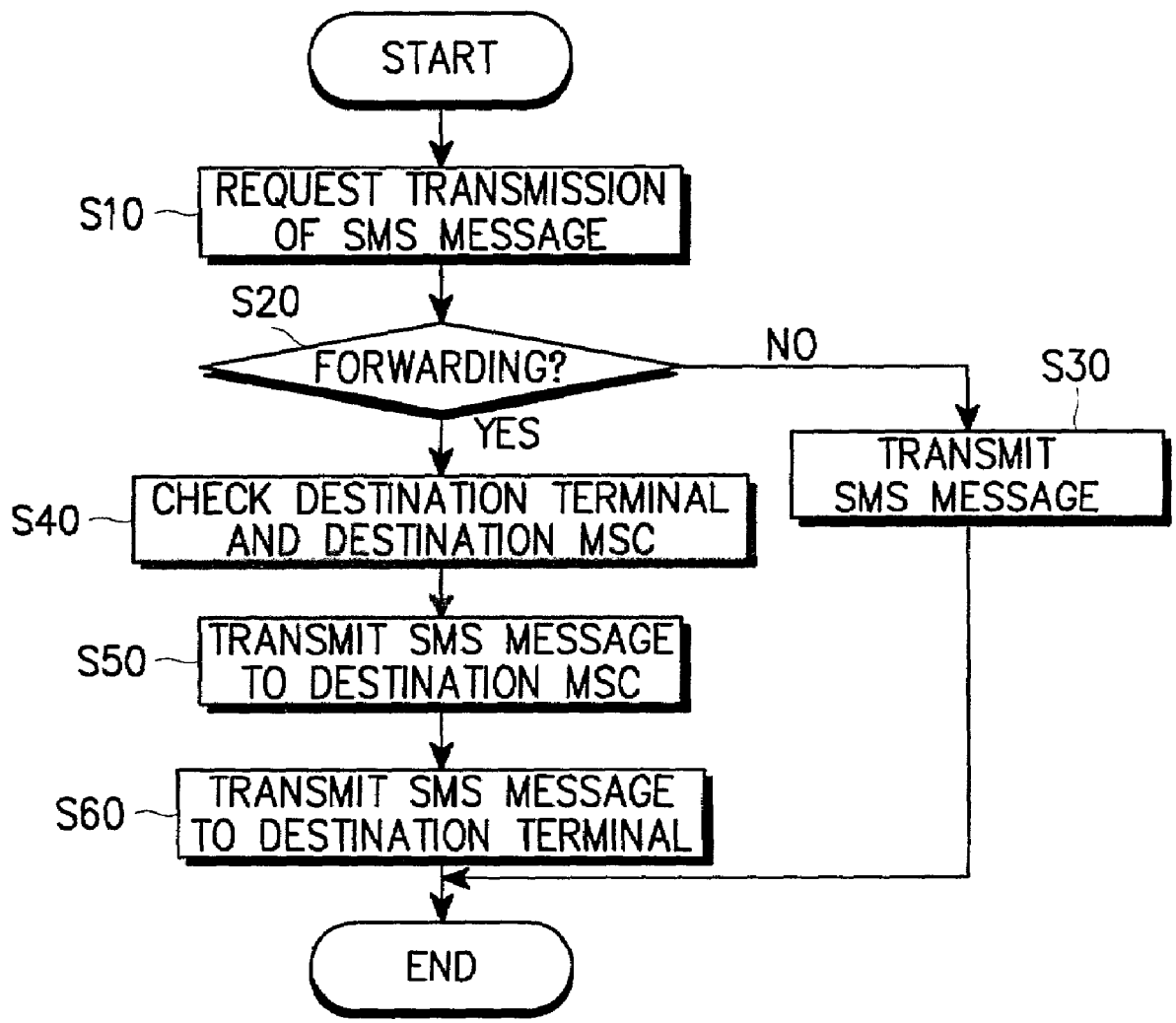
FIG. 3 is a flowchart illustrating an SMS message forwarding operation according to the present invention.

FIG. 3 is a flowchart illustrating an SMS message forwarding operation according to the present invention.

Referring to FIG. 3, if a calling mobile terminal 10 requests transmission of an SMS message to a MC 50 via a calling MSC 30 the calling MSC translates a called number received from the calling mobile terminal 10, checks a corresponding MC 50, and requests transmission of the SMS message to the MC 50 in step S10. In step S20, the MC 50 determines whether a forwarding function is set for a called mobile terminal 80, referring to the subscriber information of the called mobile terminal 80 from an HLR 40, in which the called mobile terminal 80 is registered.

If the forwarding function is not set, the MC 50 will transmit the SMS message to the called mobile terminal 80 in step S30. On the other hand, if the forwarding function is set, the MC checks a destination terminal 90 and a destination MSC 33 based on the subscriber information, in particular the location registration information of the called mobile terminal 80 in step S40, and forwards the SMS message to a destination MC 53 via the destination MSC 33 in step S50. Then, the destination MC 53 applies to an HLR 40 for the subscriber information of the destination mobile terminal 90 and, if the destination mobile terminal 90 is capable of receiving the SMS message, transmits the SMS message to the destination mobile terminal 90 in step S60.

FIG. 3 illustratively provides an outline of the SMS message forwarding procedure according to the present invention. One of ordinary skill in the art will recognize that many modifications can be made according to the types of destination terminals.

Figure 4:
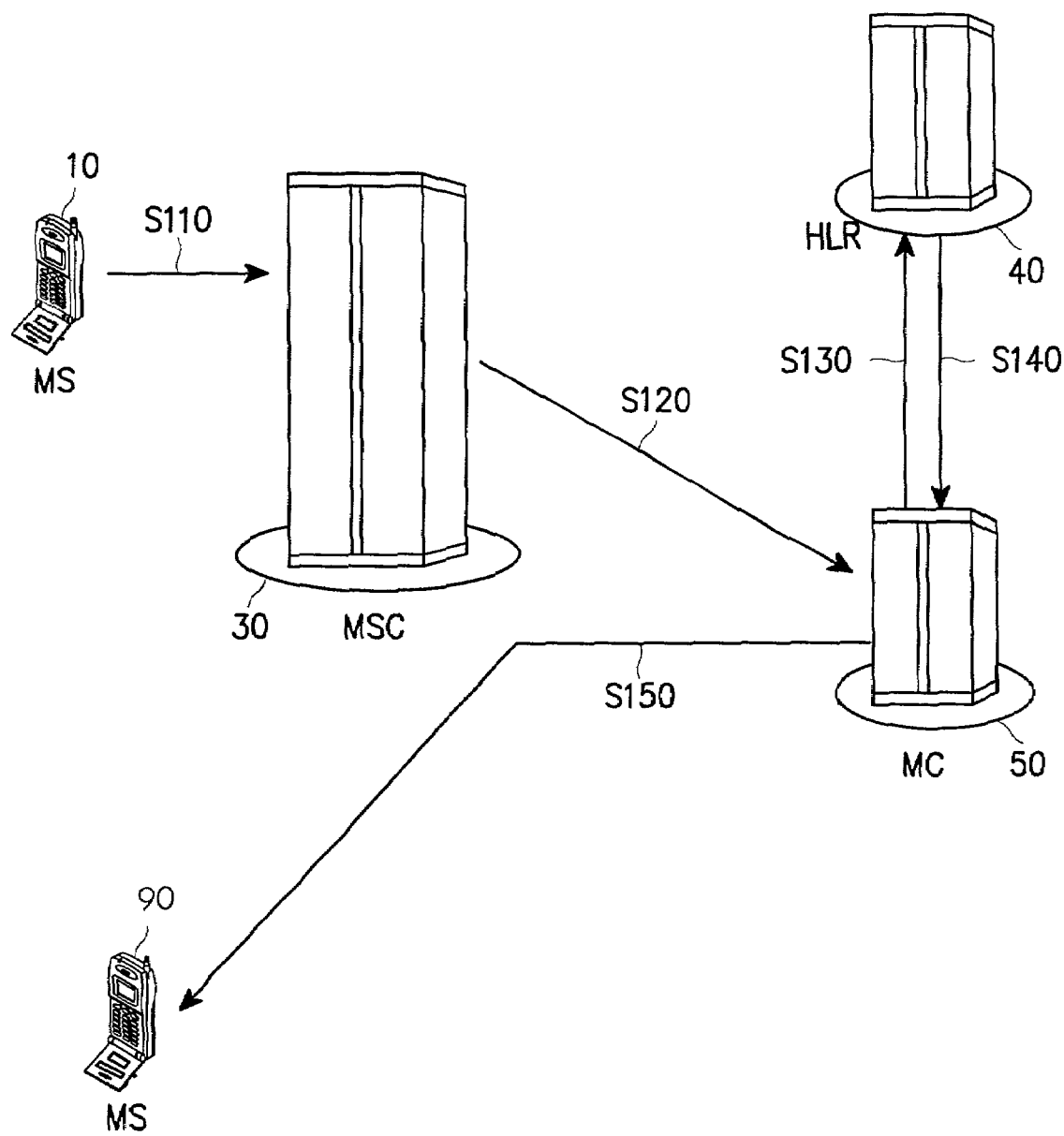
FIG. 4 illustrates an embodiment of the SMS message forwarding operation according to the present invention.

FIG. 4 illustrates an SMS message forwarding operation in the same system according to an embodiment of the present invention. In this embodiment, forwarding occurs among a calling mobile terminal 10, a called mobile terminal 80, and a destination mobile terminal 90 that are registered in the same mobile communication system. Although BS 20 is omitted from this discussion for clarity of description, it is recognized that the MS 10 is connected to an MSC 30 via a BS 20.

Referring to FIG. 4, the calling mobile terminal 10 transmits an SMS message 25 transmission request to the MSC 30 in step S110. The SMS message transmission request message includes the contents of the SMS message 25 and the MIN (Mobile Identification Number) of a called mobile terminal 80, that is, a called number. In step S120, the MSC 30 transmits the contents of the SMS message and the called number to the MC 50 to request transmission of the SMS message and the MC 50 stores the received information.

The MC 50 translates the called number and transmits a subscriber information request message to the HLR 40 in step S130. The HLR 40 searches a subscriber database using the called number for the subscriber information of the called mobile terminal 80. The subscriber information includes information about whether the called mobile terminal 80 is registered for additional services, most importantly whether an SMS message forwarding function is set for the called mobile terminal and information about a system in which the called mobile terminal is registered. The SMS message forwarding function may be incorporated in a typical voice call forwarding function or may be set separately.

If the forwarding function is registered for the called mobile terminal 80, the HLR 40 searches the subscriber database for the subscriber information of a destination mobile terminal 90 and transmits the subscriber information of the destination mobile terminal 90, particularly a destination number to the MC 50 in step S140.

In step S150, the MC 50 forwards the SMS message to the destination mobile terminal 90 in a known procedure.

Figure 5:
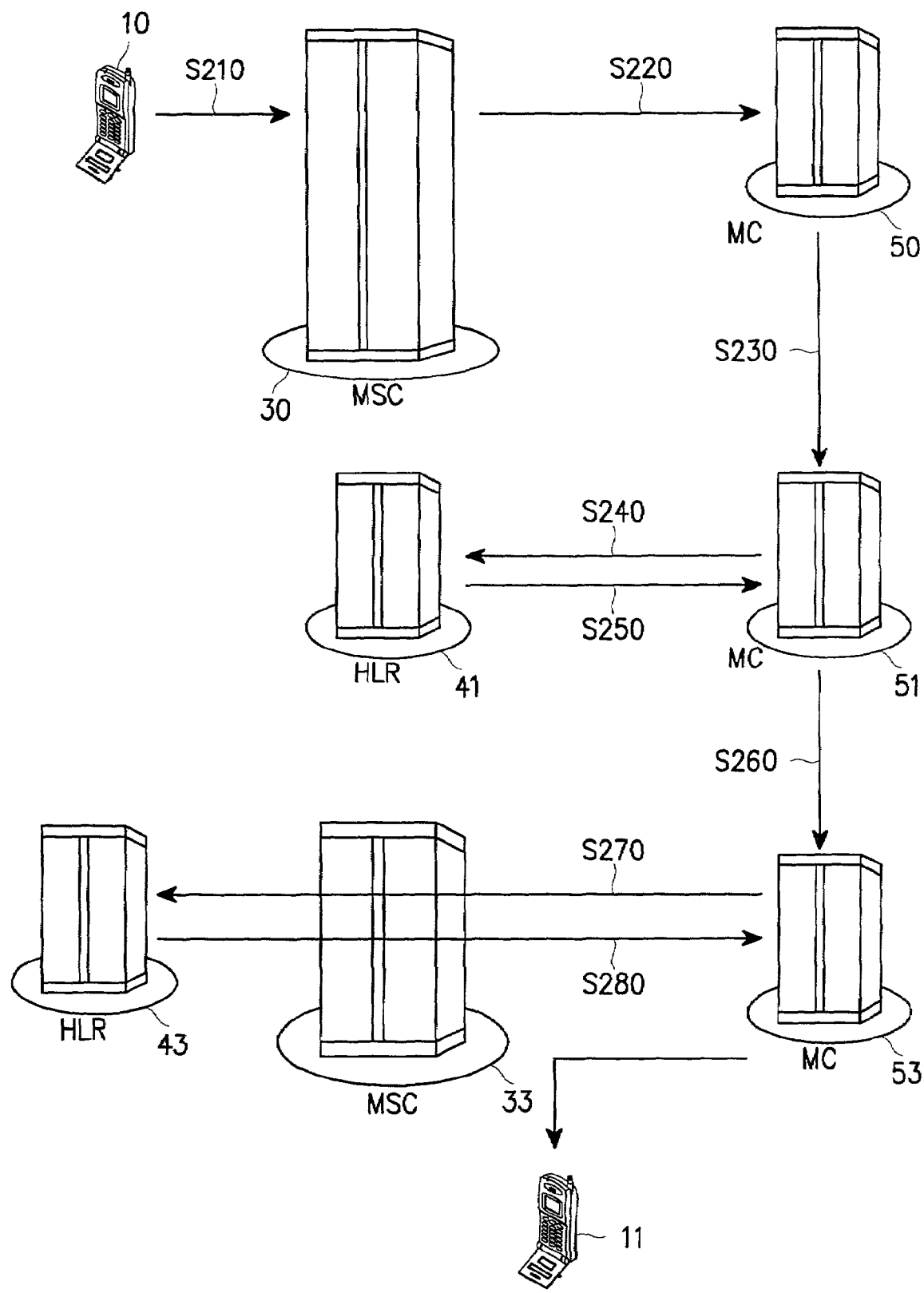
FIG. 5 illustrates another embodiment of the SMS message forwarding operation according to the present invention.

FIG. 5 illustrates an SMS forwarding operation between different systems according to another embodiment of the present invention. As shown in FIG. 5, forwarding occurs among a calling mobile terminal 10, a called mobile terminal 80 and a destination mobile terminal 90 that are registered in different mobile communication systems.

Referring to FIG. 5, when the calling mobile terminal 10 requests transmission of an SMS message to the calling MSC 30 in step S210, the calling MSC 30 transmits the contents of the intended SMS message and a called number to the MC 50 and the MC 50 stores the received information in step S220.

In step S230, the MC 50 checks a called mobile terminal 80 based on the called number and requests transmission of the SMS message to a MC 51 in which the called mobile terminal 80 is registered.

The MC 51 requests the subscriber information of the called mobile terminal 80 to a corresponding called HLR 41 in step S240. The called HLR 41 searches its subscriber database using the called number for the subscriber information of the called mobile terminal 80 and determines whether the forwarding function is set for the called mobile terminal 80. If the forwarding function is set, the called HLR 41 transmits the subscriber information of the destination mobile terminal 90 and the MC number of a mobile communication system in which the destination mobile terminal 90 is registered to the MC 51 in step S250. In step S260, the MC 51 requests transmission of the SMS message to a corresponding destination MC 53.

In step S270, the destination MC 53 requests the subscriber information of the destination mobile terminal 90 to a destination HLR 43 via a corresponding destination MSC 33. The destination HLR 43 searches its subscriber database for the subscriber information of the destination mobile terminal 90 and transmits the subscriber information to the destination MC 53 in step S280.

In Step 290, the destination MC 53 transmits the SMS message to the destination mobile terminal 90 in accordance with the procedure known in the art.

In a third embodiment of the present invention, if a destination terminal is a PSTN phone that does not support character display, an MC converts the contents of an SMS message 25 to voice and transmits the voice to an MSC in which the destination terminal is registered. The MSC transmits the voice to the PSTN phone.

Figure 6:
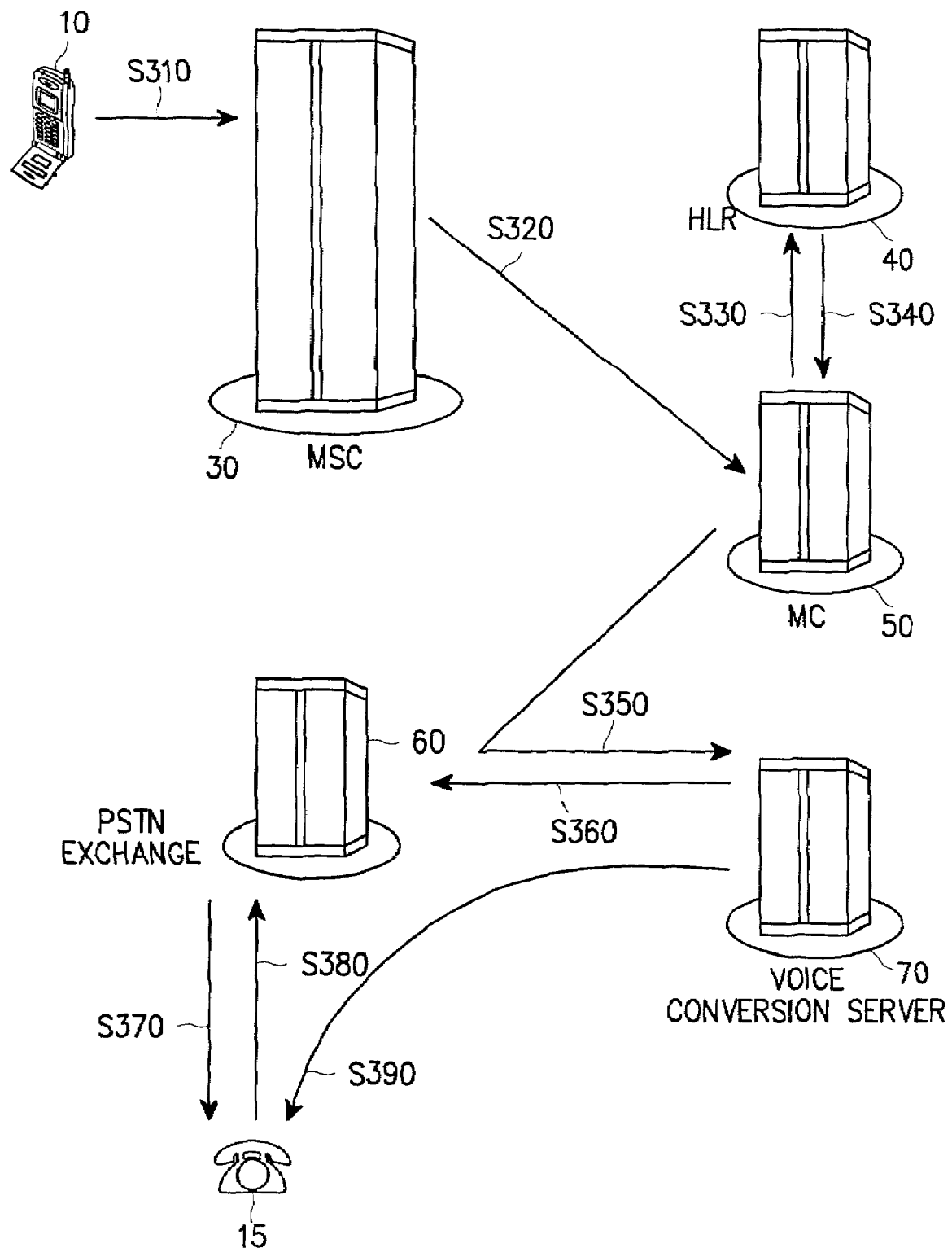
FIG. 6 illustrates a third embodiment of the SMS message forwarding operation according to the present invention.

FIG. 6 illustrates an SMS message forwarding operation to a PSTN phone according to the third embodiment of the present invention.

Referring to FIG. 6, the calling mobile terminal 10 transmits an SMS message transmission request message to the MSC 30 in step S310. Then, the MSC 30 transmits the contents of the SMS message 25 and a called number to the MC 50 and the MC 50 stores the received information in step S320.

In step S330, the MC 50 translates the called number and requests the subscriber information of a called mobile terminal 80 to the HLR 40. The HLR 40 searches the subscriber database for the subscriber information of the called mobile terminal 80 and determines whether a forwarding function is set for the called mobile terminal 80. If the forwarding function is set and a destination terminal 90 is a PSTN phone 15, the HLR 40 transmits the number of the PSTN phone 15 to the MC 50 in step S340.

In step S350, the MC 50 transmits the number of the calling mobile terminal 10, the number of the PSTN phone 15, and a voice message to a voice conversion server 70 to request transmission of the SMS message 25. The voice conversion server 70 interfaces with a PSTN exchange 60 and converts the contents of the received SMS message to a voice message format.

After voice conversion is completed, the voice conversion server 70 requests routing to the destination PSTN phone 15 to the PSTN exchange 60 in step S360. In step S370, the PSTN exchange 60 establishes a path to the destination PSTN phone 15. If the destination PSTN phone 15 is found available for transmission in step S380, the PSTN exchange

60 notifies the voice conversion server 70 of its available status and the voice conversion server 70 transmits the converted voice message to the destination PSTN phone 15 through the established path in step S390.

In accordance with the present invention as described above, an additional service such as SMS messages can be forwarded, allowing destination mobile terminals to receive registered additional services.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of forwarding an SMS (Short Message Service) message in a mobile communication system having at least one MSC (Mobile Switching Center) for providing communication services to a plurality of mobile terminals, at least one MC (Message Center) interconnecting with the MSC for providing an SMS, a PSTN (Public Switched Telephone Network) exchange interconnecting with the MSC, and a voice conversion server interconnecting with the PSTN exchange, comprising the steps of:

requesting transmission of an SMS message from a calling mobile terminal to the MC via the MSC;

searching for the subscriber information of a called mobile terminal and determining whether a forwarding function is set for the called mobile terminal in the MC;

requesting transmission of the SMS message from the MC to the voice conversion server via the PSTN exchange if it is determined that the forwarding function is set and a destination terminal is a PSTN phone;

converting the SMS message to a voice message in the voice conversion server and requesting establishment of a path to the destination terminal from the voice conversion server to the PSTN exchange; and transmitting the converted voice message from the voice conversion server to the destination terminal after the PSTN establishes the path.

* * * * *